(12) United States Patent
Cannon

(10) Patent No.: US 10,591,237 B1
(45) Date of Patent: Mar. 17, 2020

(54) FIREARM WITH BIOMETRIC SAFETY MECHANISM

(71) Applicant: Patrick Cannon, Verndale, MN (US)

(72) Inventor: Patrick Cannon, Verndale, MN (US)

( * ) Notice: Subject to any disclaimer, the term of this patent is extended or adjusted under 35 U.S.C. 154(b) by 0 days.

(21) Appl. No.: 15/976,567

(22) Filed: May 10, 2018

Related U.S. Application Data

(60) Provisional application No. 62/503,976, filed on May 10, 2017.

(51) Int. Cl.
*F41A 17/06* (2006.01)
*G01S 19/13* (2010.01)

(52) U.S. Cl.
CPC ............ *F41A 17/066* (2013.01); *G01S 19/13* (2013.01)

(58) Field of Classification Search
CPC ...... F41A 17/063; F41A 17/066; F41A 17/06; F41A 17/54; F41A 19/01
USPC ........................ 42/70.11, 70.01, 70.06, 70.08
See application file for complete search history.

(56) References Cited

U.S. PATENT DOCUMENTS

| | | | | |
|---|---|---|---|---|
| 4,467,545 A * | 8/1984 | Shaw, Jr. | ............ | G07C 9/00158 42/70.01 |
| 4,682,435 A * | 7/1987 | Heltzel | ................. | F41A 17/063 42/70.01 |
| 5,459,957 A * | 10/1995 | Winer | ................... | F41A 17/066 42/70.11 |
| 5,461,812 A * | 10/1995 | Bennett | ................ | F41A 17/063 42/70.06 |
| 5,675,925 A * | 10/1997 | Wurger | ................... | F41A 17/06 42/70.06 |
| 5,915,936 A * | 6/1999 | Brentzel | ............... | F41A 17/063 42/70.11 |
| 5,937,557 A * | 8/1999 | Bowker | ................ | F41A 17/066 102/472 |
| 5,953,844 A * | 9/1999 | Harling | ................. | F41A 17/063 42/70.06 |
| 6,223,461 B1 * | 5/2001 | Mardirossian | .......... | F41A 17/06 42/70.11 |
| 6,237,271 B1 * | 5/2001 | Kaminski | ............. | F41A 17/063 42/70.01 |
| 6,301,815 B1 * | 10/2001 | Sliwa | .................... | F41A 17/066 42/70.01 |
| 6,343,140 B1 | 1/2002 | Brooks | | |
| 6,343,429 B1 * | 2/2002 | Mossberg | ............. | F41A 17/063 42/70.01 |
| 6,412,207 B1 * | 7/2002 | Crye | ....................... | F41A 17/02 42/70.01 |
| 6,415,542 B1 * | 7/2002 | Bates | ...................... | F41A 17/06 42/70.05 |
| 6,438,887 B1 * | 8/2002 | Martin | .................... | F41A 17/06 42/70.11 |
| 6,477,801 B1 * | 11/2002 | O'dwyer | ............... | F41A 17/066 42/70.01 |
| 6,499,243 B1 | 12/2002 | Herzog | | |
| 6,533,149 B2 * | 3/2003 | Vor Keller | ............ | F41A 17/066 224/244 |

(Continued)

*Primary Examiner* — Michael D David
(74) *Attorney, Agent, or Firm* — Cramer Patent & Design, PLLC; Aaron R. Cramer

(57) ABSTRACT

A firearm has a battery-operated biometric scanning device secured along an interior side edge of the firearm grip. The biometric scanning device is configured with a microprocessor which disables the trigger mechanism of the firearm when an invalid fingerprint is scanned. The device has an integrated positioning tracking system.

12 Claims, 5 Drawing Sheets

(56) References Cited

U.S. PATENT DOCUMENTS

| | | | |
|---|---|---|---|
| 6,563,940 B2 | 5/2003 | Recce | |
| 6,823,621 B2 * | 11/2004 | Gotfried | F41A 17/066 42/70.01 |
| 6,856,238 B2 * | 2/2005 | Wootton | F41A 17/063 340/10.1 |
| 6,861,944 B1 * | 3/2005 | Hoepelman | A43B 3/0005 340/5.1 |
| 7,168,198 B2 * | 1/2007 | Newkirk | F41A 17/06 42/70.01 |
| 7,200,965 B2 * | 4/2007 | Vor Keller | E05B 47/0603 224/244 |
| 7,600,339 B2 * | 10/2009 | Schumacher | F41A 17/063 42/70.01 |
| 7,802,392 B2 * | 9/2010 | Peterson | F41A 11/02 42/124 |
| 7,921,588 B2 * | 4/2011 | Brown | G08B 15/00 42/114 |
| 8,312,660 B1 * | 11/2012 | Fujisaki | F41A 17/08 42/70.01 |
| 8,991,087 B2 | 3/2015 | Ruffin | |
| 9,097,479 B1 * | 8/2015 | Barido | F41A 17/066 |
| 9,404,699 B1 * | 8/2016 | Barido | F41A 17/54 |
| 2001/0032407 A1 * | 10/2001 | Cain | F41A 17/063 42/70.11 |
| 2002/0112390 A1 * | 8/2002 | Harling | F41A 17/066 42/70.11 |
| 2003/0070343 A1 * | 4/2003 | Glock | F41A 17/063 42/70.11 |
| 2005/0257411 A1 * | 11/2005 | Wootton | F41A 17/063 42/70.01 |
| 2005/0262751 A1 * | 12/2005 | Leslie | F41A 17/00 42/70.01 |
| 2006/0042142 A1 * | 3/2006 | Sinha | F41A 17/063 42/1.01 |
| 2006/0208857 A1 * | 9/2006 | Wong | F41C 33/0209 340/5.82 |
| 2007/0124979 A1 | 6/2007 | Newkirk et al. | |
| 2008/0000130 A1 | 1/2008 | Mauch et al. | |
| 2008/0134556 A1 | 6/2008 | Remelin | |
| 2009/0007476 A1 * | 1/2009 | Mauch | F41A 17/063 42/1.01 |
| 2009/0037374 A1 * | 2/2009 | Delia | F41A 17/063 |
| 2009/0064557 A1 * | 3/2009 | Hughes | F41A 17/063 42/70.01 |
| 2009/0255160 A1 * | 10/2009 | Summers | F41A 17/063 42/70.01 |
| 2010/0281725 A1 * | 11/2010 | Arbouw | F41A 9/62 42/1.02 |
| 2011/0056108 A1 * | 3/2011 | McCord | F41A 17/066 42/70.01 |
| 2011/0067282 A1 * | 3/2011 | August | F41A 17/063 42/1.03 |
| 2011/0113664 A1 * | 5/2011 | Delgado Acarreta | F41A 17/06 42/70.11 |
| 2011/0119979 A1 * | 5/2011 | Gussalli Beretta | F41A 19/01 42/1.02 |
| 2011/0162514 A1 * | 7/2011 | Osborne | F41A 17/063 89/27.12 |
| 2015/0082890 A1 | 3/2015 | Pant et al. | |
| 2016/0054083 A1 * | 2/2016 | Kiyani | F41A 17/063 42/70.11 |
| 2017/0010062 A1 * | 1/2017 | Black | F41A 17/063 |
| 2017/0160041 A1 * | 6/2017 | Stewart | F41A 35/00 |

* cited by examiner

FIREARM WITH BIOMETRIC SAFETY MECHANISM

RELATED APPLICATIONS

The present invention is a continuation of and claims the benefit of U.S. Application No. 62/503,976, filed May 10, 2017, the entire disclosures of which are incorporated herein by reference.

FIELD OF THE INVENTION

The present invention relates generally to the field of a firearm having a battery-operated biometric scanning device secured along an interior side edge of the firearm grip. The biometric scanning device is configured with a microprocessor which disables the trigger mechanism of the firearm when an invalid fingerprint is scanned. The device has an integrated positioning tracking system.

BACKGROUND OF THE INVENTION

All too often we hear of children or other adults who have accidentally been shot with a firearm or have been a victim of a suicide by someone else's firearm. While the causes are many and the blame can be distributed to all involved parties, the simple fact remains that a proper locking mechanism could eliminate most all of these tragedies. There are different methods of securing guns against unauthorized used, but they all have some disadvantages associated with them. If the gun is secured in a locked cabinet, it is not readily available for use in self-defense.

Trigger locks are also cumbersome should the keys become lost or needed quickly. Finally, all methods that rely on keys to secure the locking means are subject to picking or unauthorized key copying. Accordingly, there is a need for a means by firearms can be secured so that they are impossible to fire by unauthorized users, but can be quickly accessed in the event that the handgun is needed. The development of the firearm with biometric safety mechanism fulfills this need.

SUMMARY OF THE INVENTION

The principles of the present invention provide for A biometric recognition safety mechanism for a firearm comprises a power source, a GPS module in wireless communication with the power source which is capable of generating a location signal, a memory module in electrical communication with the GPS module and the power source, a processor in electrical communication with the memory module and the power source, a first biometric sensor configured to sense biometric properties of a user, located on a grip of the firearm, and in electrical communication with the power source and the memory module and a mechanical activation device in electrical communication with the processor and the power source and in operable communication with a safety linkage of the firearm. The location signal is transmitted to the memory module. The pre-authorized biometric properties of the user are configured to be stored on the memory module. The mechanical activation device is activated to enable the firearm when the sensed biometric properties of the user match the pre-authorized biometric properties. In a separate embodiment the biometric sensor(s) may be disposed on the surface of the firearm and not limited to the grip.

The safety mechanism also may comprise a communications port located on the firearm, and in electrical communication with the processor and the power source and configured to be in electrical communication with a personal computer. The first biometric sensor may comprise a palm sensor. The device may further comprise a second biometric sensor within the grip and located adjacent the first biometric sensor. The second biometric sensor may comprise a fingerprint sensor configured to obtain and transmit a finger print data of the user to the processor.

A charging regulator circuit in electrical communication with the communications port and the power supply may also be provided while the communications port may be weather resistant. The palm sensor may be configured to obtain and transmit a skin pH data of the user to the processor a skin temperature data of the user to the processor and or a palm print data of the user to the processor.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
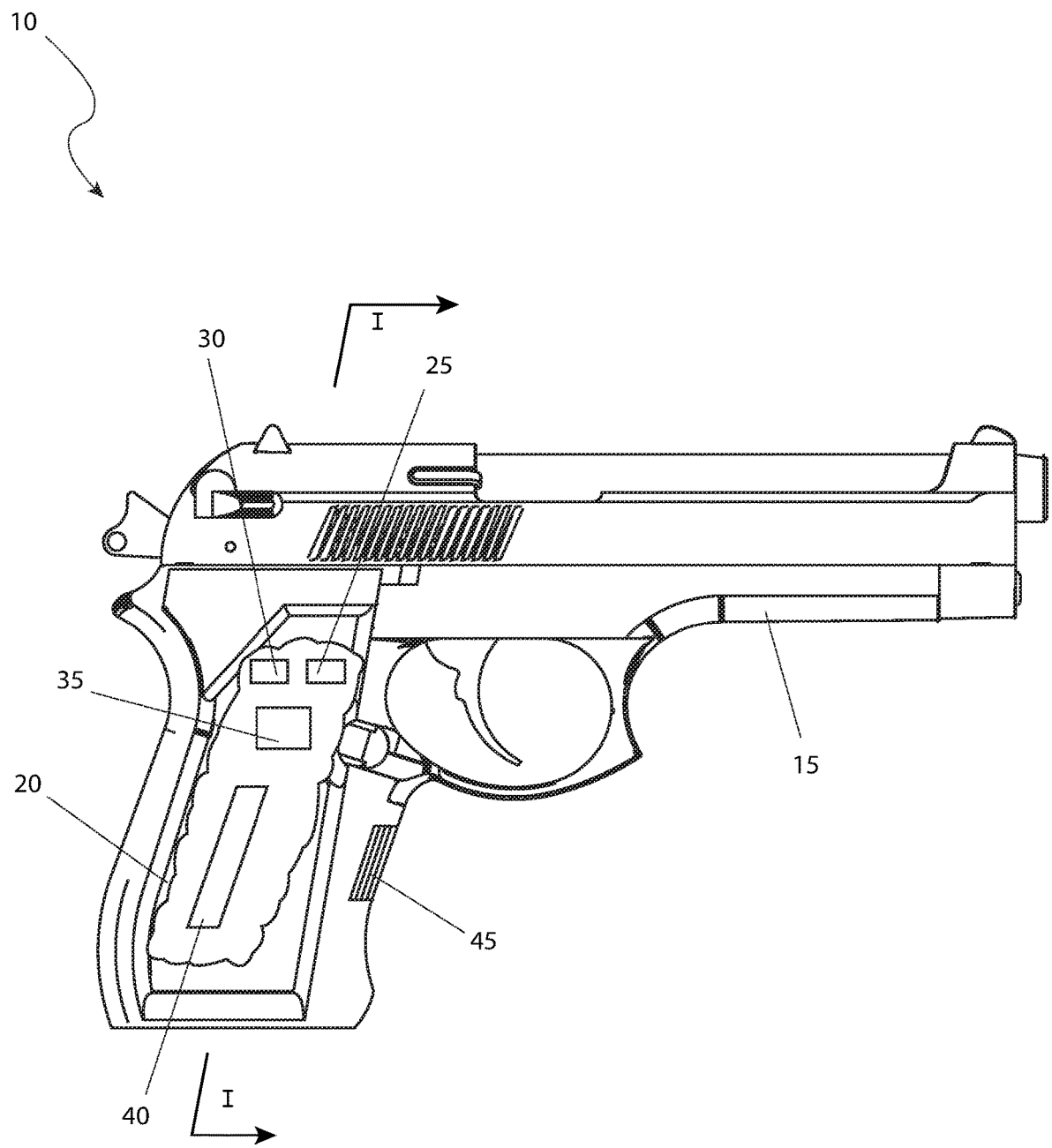
FIG. 1 is a front view of a firearm with biometric safety mechanism 10, according to the preferred embodiment of the present invention.

DESCRIPTIVE KEY 10 firearm with biometric safety mechanism
15 firearm
20 grip
25 GPS module
30 non-volatile memory
35 processor
40 biometric palm sensor
45 biometric fingerprint sensor
50 mechanical activation device
55 rechargeable battery
60 mechanical safety linkage
65 trigger
70 removable magazine
75 weatherproof communications port
80 charging regulator circuit
85 bi-directional data path
90 first interface circuit
95 second interface circuit

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a front view of the firearm with biometric safety mechanism 10, according to the preferred embodiment of the present invention, is disclosed. The firearm with biometric safety mechanism 10 (herein described as the "device") 10, is provided as an integrated system wholly provided as an integral part of an otherwise standard firearm 15. The firearm 15 in FIG. 1 is depicted as a semi-automatic handgun for purposes of illustration. However, other types of firearms including but not limited to pistols, hunting rifles, military rifles, shotguns, and the like could also benefit from the teachings of the biometric recognition safety system for firearms 10, and as such, the following descriptions regarding use on a semi-automatic handgun should not be interpreted as a limiting factor of the present invention.

The components of the device 10 are all internal to the firearm 15 and are integrated and installed during initial manufacture of the firearm 15. None of the components of the device 10 are serviceable, capable of being disabled, nor even removable by the final user. The teachings of the device 10 are not intended for retrofit applications or use. Due to the internal construction, some components of the device 10 are shown via a cutaway view depicting interior areas of the firearm 15. On the interior of the grip 20, a GPS module 25, a non-volatile memory 30, a processor 35, and a biometric palm sensor 40 is depicted. The GPS module 25 is used to determine the position where the firearm 15 is fired. This information is then recorded to the non-volatile memory 30 as interfaced to the processor 35. The biometric palm sensor 40 is used to sense various biometric properties of the shooter to determine eligibility. Properties that are sensed include but are not limited to: skin density, skin prints, pH, temperature, mass, and the like. These properties are compared to pre-authorized values contained within the non-volatile memory 30 instantaneously. Should a match be obtained, the firearm 15 is enabled to fire. Such enabling will be described herein below.

A biometric fingerprint sensor 45 is provided on the forward portion of the grip 20. The biometric fingerprint sensor 45 senses various biometric properties of the shooter to determine eligibility. Properties that are sensed include but are not limited to: fingerprints, finger print density, pH, temperature, mass, and the like. These properties are compared to pre-authorized values contained within the non-volatile memory 30 instantaneously. The biometric fingerprint sensor 45 and biometric palm sensor 40 operate in a simultaneous manner. Only one (1) match via either the biometric palm sensor 40 or the biometric fingerprint sensor 45 in the processor 35 is necessary in order to enable the firearm 15. This feature provides near instantaneous reaction time and ensures that the capability of the firearm 15 is available as soon as it is needed in life-threatening situations.

Figure 2:
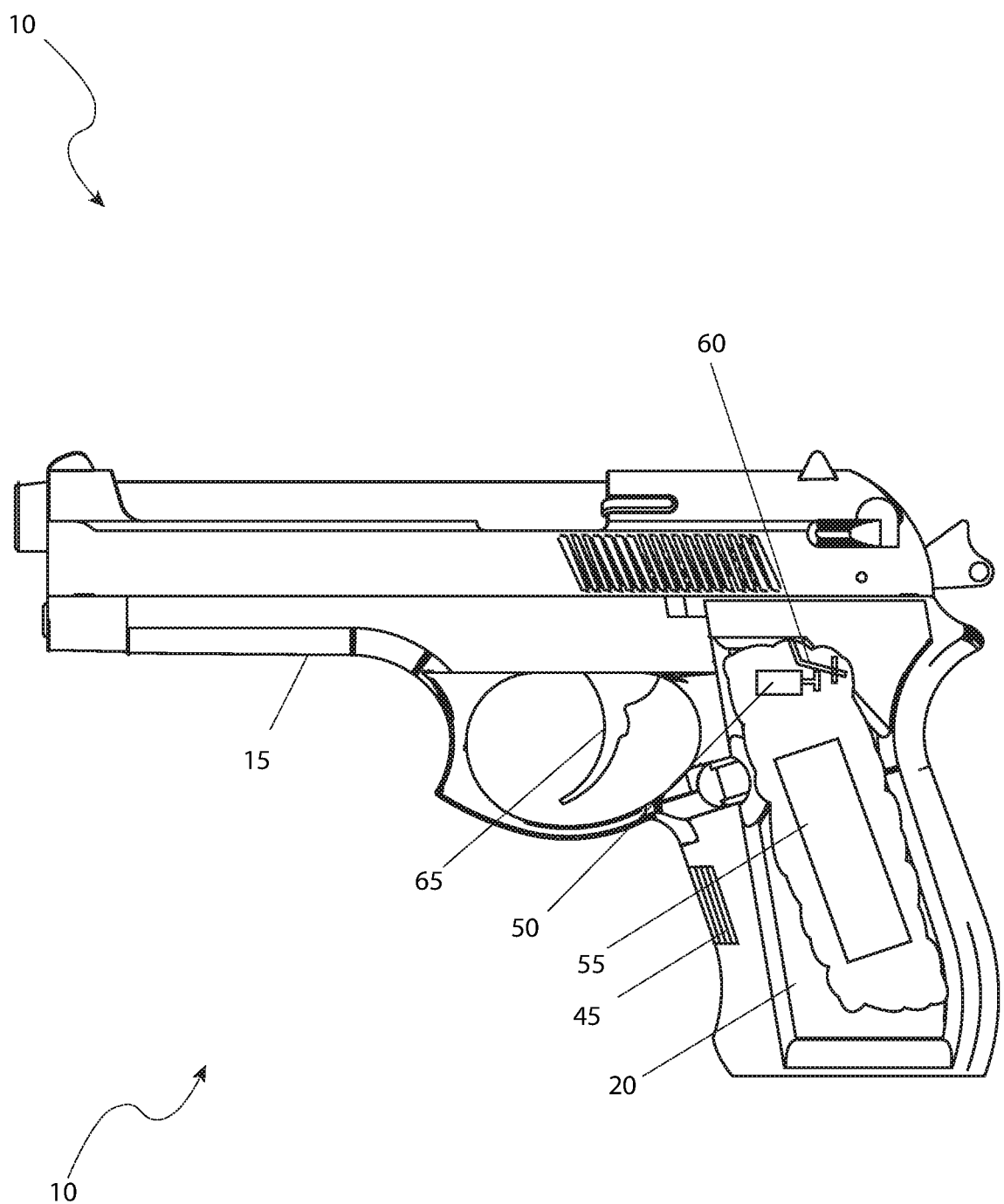
FIG. 2 is a rear view of the firearm with biometric safety mechanism 10, according to the preferred embodiment of the present invention.

Referring now to FIG. 2, a rear view of the device 10, according to the preferred embodiment of the present invention is depicted. Due to the internal construction, some components of the device 10 are shown via a cutaway view depicting interior areas of the firearm 15. On the interior of the grip 20, a mechanical activation device 50, and a rechargeable battery 55 is depicted. The mechanical activation device 50 is used to enable the firearm 15 to be fired. The mechanical activation device 50 is envisioned to be a servo motor, solenoid, stepper motor, or the like. The use of a specific type of mechanical activation device 50 is not intended to be a limiting factor of the present invention. The rechargeable battery 55 provides operating power for the device 10. Recharging and operation of the rechargeable battery 55 will be described in greater detail herein below.

The mechanical activation device 50 operates against a mechanical safety linkage 60 on the interior of the firearm 15. The graphical image of the mechanical safety linkage 60 as depicted is for illustrative purposes only. Various different styles and placement of the mechanical safety linkage 60 would be necessary on different makes and models of firearm 15. The action of the mechanical activation device 50 locks the safety system of the firearm 15 and not the trigger 65. The biometric fingerprint sensor 45 is also visible in this figure as indicated. The mechanical activation device 50 is of a fail-safe design and is designed to disable the firearm 15 if power is not applied. In such a manner, access to the firearm 15 is not possible should any other components of the device 10 fail, including but not limited to a discharged rechargeable battery 55.

Figure 3:
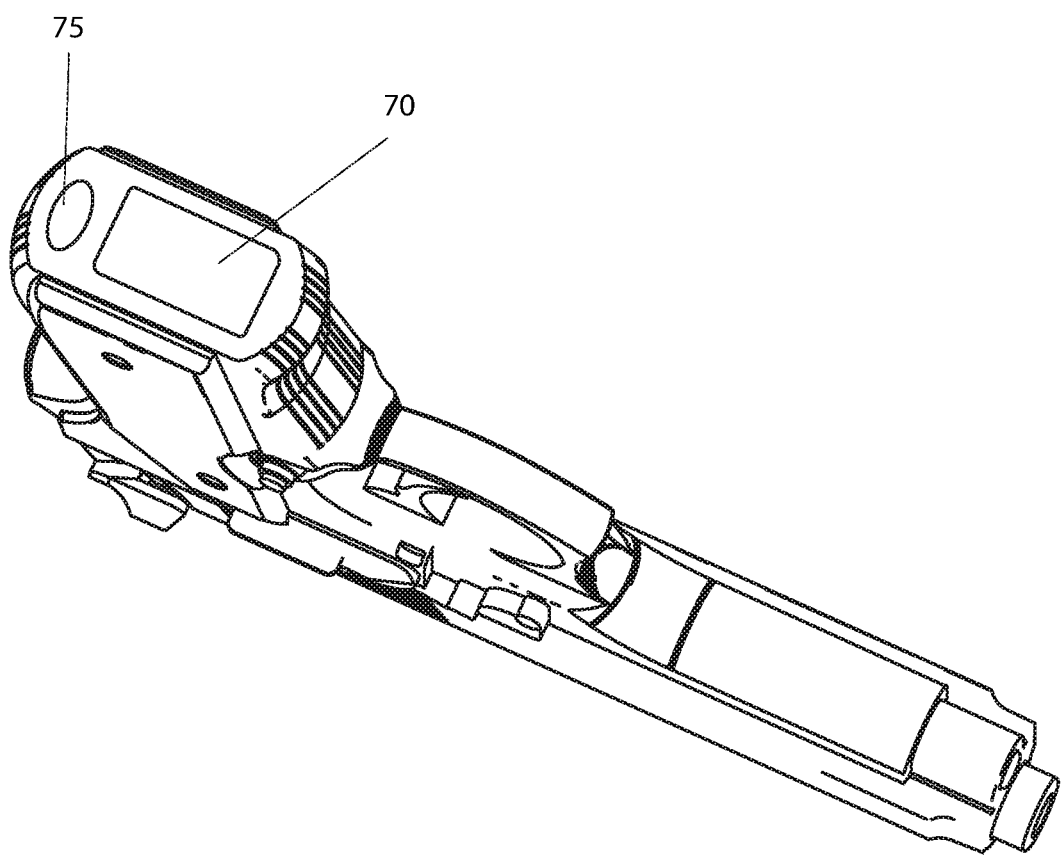
FIG. 3 is a bottom view of the firearm with biometric safety mechanism 10, according to the preferred embodiment of the present invention.

Referring next to FIG. 3, a device 10, according to the preferred embodiment of the present invention is shown. This figure depicts the conventional removable magazine 70 which functions in a normal manner to load the firearm 15. A weatherproof communications port 75 is located immediately aft of the removable magazine 70. The weatherproof communications port 75 is envisioned to connect via a cable to a personal computer running proprietary encrypted software that is governed and controlled for distribution and use by authorized agencies such as government agencies, military agencies, police departments, sheriff departments, and the like. The weatherproof communications port 75 allows for recharging of the rechargeable battery 55 (as shown in FIG. 2) as well as initial programming of the device 10 as well as reprogramming of the device 10 should the device 10 be sold or inherited after the original owner's death, or any other situation in which the authorized user of the device 10 should change. This initial programming or reprogramming would be in addition to any current firearm usage regulations such as age restrictions, permits, licenses, background checks and the like. The weatherproof communications port 75 also affords access to the contents of the non-volatile memory 30 thereby allowing downloading of historical data including but not limited to: time of use, frequency of use, and location of use via interface with the GPS module 25 (as shown in FIG. 1).

Figure 4:
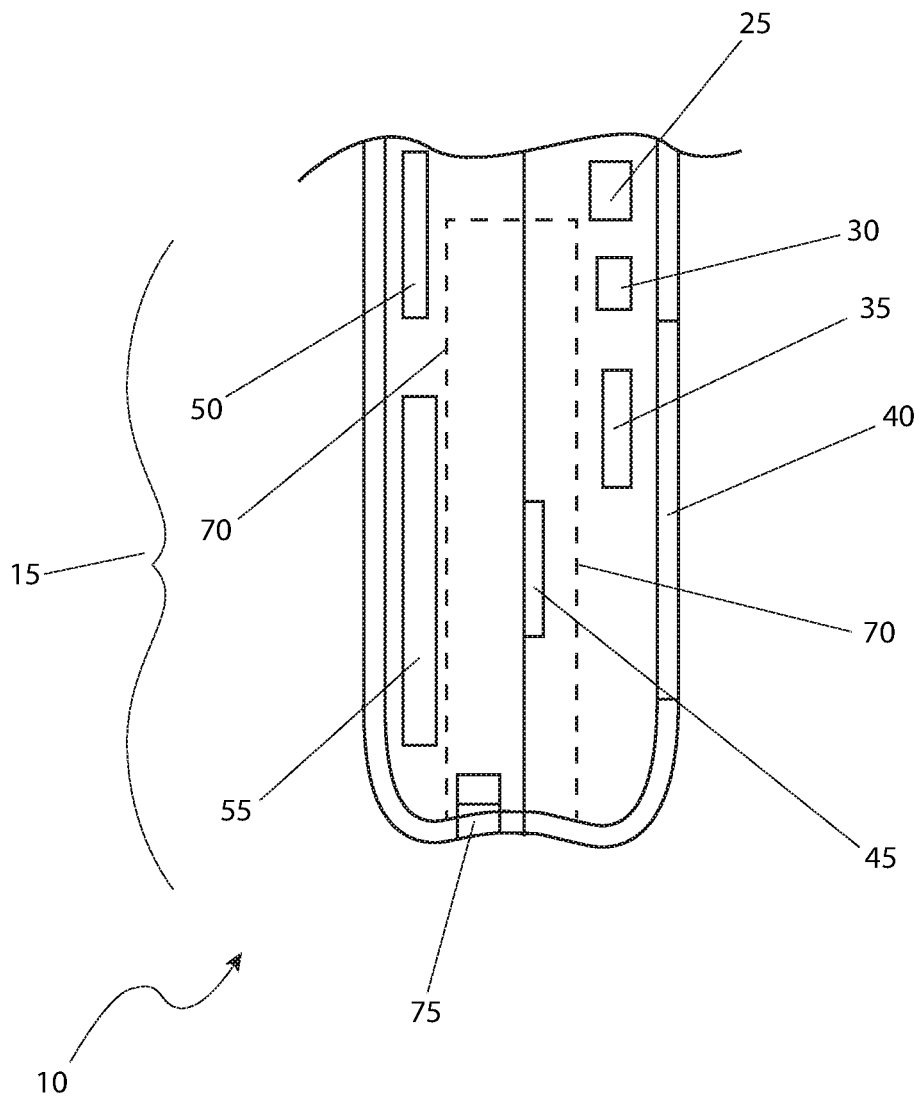
FIG. 4 is a sectional view of the firearm with biometric safety mechanism 10, as seen along a line I-I, as shown in FIG. 1, according to the preferred embodiment of the present invention; and, FIG. 5 is a functional electrical block diagram of the firearm with biometric safety mechanism 10, according to the preferred embodiment of the present invention.

Referring now to FIG. 4, a sectional view of the device 10 10, as seen along a line I-I, as shown in FIG. 1, according to the preferred embodiment of the present invention is disclosed. This figure clearly depicts the biometric palm sensor 40 and the biometric fingerprint sensor 45 used to determine the authenticity of the user. The GPS module 25, the non-volatile memory 30 and the processor 35 are depicted on the right side of the firearm 15 while the mechanical activation device 50 and the rechargeable battery 55 are shown on the left side of the firearm 15 with the weatherproof communications port 75 on the bottom. The removable magazine 70 is centrally positioned, as normally expected, and shown via dashed lines for purposes of illustration.

Figure 5:
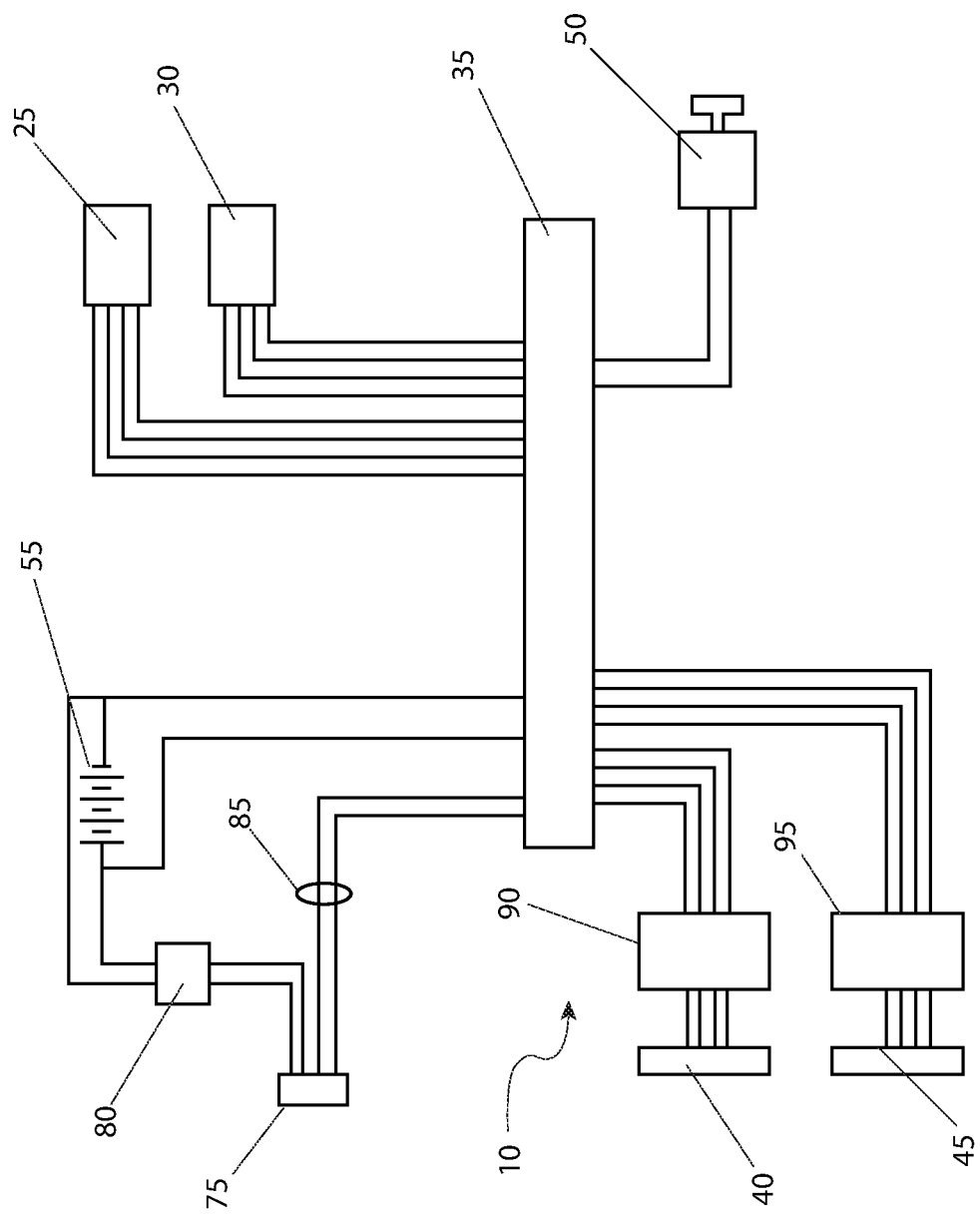

Referring finally to FIG. 5, a functional electrical block diagram of the device 10, according to the preferred embodiment of the present invention is depicted. The weatherproof communications port 75 is electrically connected to a charging regulator circuit 80 which supplies power to the rechargeable battery 55. The overall requirements of the device 10 are low and recharging is only required on an infrequent basis, envisioned to be approximately once a year. The weatherproof communications port 75 also provides a bi-directional data path 85 to the processor 35 for purposes of uploading authentic user parameters as well as downloading historical data. The processor 35 is communicatively connected to the GPS module 25 and the non-volatile memory 30 as is well-known in the art. The biometric palm sensor 40 and the biometric fingerprint sensor 45 are connected as inputs to the processor 35 via a first interface circuit 90 and second interface circuit 95 respectively. The mechanical activation device 50 is connected to the processor 35 as its sole output.

The preferred embodiment of the present invention can be utilized by the common user in a simple and effortless manner with little or no training. It is envisioned that the device 10 would be constructed in general accordance with FIG. 1 through FIG. 5.

The device 10 is envisioned to be manufactured via a conventional manufacturer of firearms 15 due to its complexity and integration within the inner mechanism of the firearm 15. However, it is also possible that the teachings of the present invention could be incorporated into an aftermarket kit for installation upon existing firearms 15 via skilled craftsmen in which major disassembly of the firearm 15 is undertaken with major subcomponents replaced via kit contents. After said procurement or aftermarket installation has occurred the device 10 is ready for initial programming.

To program the device 10 for initialization, the user would take the device 10 to an authorized programmer such as their local law enforcement department as aforementioned described along with any necessary purchase documentation, identification requirements, registration paper, activation fees, or the like. The authorized programmer would then connect a suitable cable to the weatherproof communications port 75 from a personal computer running the activation software. Biometric data from both the biometric palm sensor 40 and the biometric fingerprint sensor 45 would then collected while the user held the device 10 from several different access points. This data would be saved into the non-volatile memory 30 and verified by dry fire operations. At this point in time, the device 10 is ready for operation.

The device 10 can be fired in a normal and transparent manner to the authorized user. Upon gripping the device 10 in a firing position, the biometric palm sensor 40 and/or biometric fingerprint sensor 45 would gather respective data from the user's hand and compare it to the authorized data previously stored within the non-volatile memory 30. Should a match occur, the processor 35 would activate the mechanical activation device 50 thus releasing the mechanical safety linkage 60. At this point in time, the device 10 is able to fire in a conventional manner. Should the device 10 be in possession of an unauthorized user, the biometric data from the biometric palm sensor 40 and the biometric fingerprint sensor 45 will not match. The processor 35 would not enable the mechanical activation device 50, thus prohibiting the firearm 15 from firing.

The operation continues in a repeating manner with necessary recharging of the rechargeable battery 55 as required. Should the device 10 be sold, or the authorized user otherwise change, the device 10 would be taken to an authorized programmer as aforementioned described for reprogramming. This operation would continue on as as-needed basis for the life of the handgun in a circular manner.

Such features allow one to ensure that handguns and all types of firearms 15 are secure from unauthorized or accidental use without the inefficiencies of conventional weapon locking means such as trigger locks and the like. It is perfect for those who may misplace keys as commonly used on conventional handgun locks. It is also ideal for law enforcement officers, military personnel, guards, and others who must quickly get at a locked firearm. Lastly, it provides real security in home with children and others who may be mentally unstable.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A biometric recognition safety mechanism, comprising:
   a power source;
   a GPS module in wireless communication with said power source, capable of generating a location signal;
   a memory module in electrical communication with said GPS module and said power source;
   a processor in electrical communication with said memory module and said power source;
   a first biometric sensor that senses a plurality of biometric properties of a user, located on a grip of a firearm, and in electrical communication with said power source and said memory module; and,
   a mechanical activation device in electrical communication with said processor and said power source and in operable communication with a mechanical safety linkage of said firearm;
   wherein said location signal is transmitted to said memory module;
   wherein pre-authorized biometric properties of said user are configured to be stored on said memory module; and,
   wherein said mechanical activation device locks the mechanical safety linkage of the firearm and not a trigger;
   wherein said first biometric sensor comprises a palm sensor;
   wherein said palm sensor is configured to obtain and transmit a plurality of skin pH data of said user to said processor;
   wherein said palm sensor is further configured to obtain and transmit a plurality of skin temperature data of said user to said processor; and wherein said palm sensor is further configured to obtain and transmit a plurality of palm print data of said user to said processor.

2. The safety mechanism of claim 1, further comprising a second biometric sensor having a fingerprint sensor configured to obtain and transmit a plurality of fingerprint data of said user to said processor.

3. The safety mechanism of claim 2, wherein said second biometric sensor is within said grip and located adjacent said first biometric sensor.

4. The safety mechanism of claim 1, further comprising a communications port located on said firearm, and in electrical communication with said processor and said power source and configured to be in electrical communication with a personal computer.

5. The safety mechanism of claim 4, further comprising a charging regulator circuit in electrical communication with said communications port and said power supply.

6. The safety mechanism of claim 5, wherein said communications port is weather resistant.

7. A biometric recognition safety mechanism, comprising:
a power source;
a GPS module in wireless communication with said power source, capable of generating a location signal;
a memory module in electrical communication with said GPS module and said power source;
a processor in electrical communication with said memory module and said power source;
a first biometric sensor configured to sense biometric properties of a user, disposed upon a surface of a firearm, and in electrical communication with said power source and said memory module; and,
a mechanical activation device in electrical communication with said processor and said power source and in operable communication with a mechanical safety linkage of said firearm;

wherein said location signal is transmitted to said memory module;
wherein pre-authorized biometric properties of said user are configured to be stored on said memory module; and,
wherein said mechanical activation device locks the mechanical safety linkage of the firearm and not a trigger;
wherein said first biometric sensor comprises a palm sensor;
wherein said palm sensor is configured to obtain and transmit a plurality of skin pH data of said user to said processor;
wherein said palm sensor is further configured to obtain and transmit a plurality of skin temperature data of said user to said processor; and
wherein said palm sensor is further configured to obtain and transmit a plurality of palm print data of said user to said processor.

8. The safety mechanism of claim 7, further comprising a second biometric sensor disposed upon said surface of said firearm and located adjacent said first biometric sensor.

9. The safety mechanism of claim 8, wherein said second biometric sensor comprises a fingerprint sensor configured to obtain and transmit a plurality of fingerprint data of said user to said processor.

10. The safety mechanism of claim 7, further comprising a communications port located on said firearm, and in electrical communication with said processor and said power source and configured to be in electrical communication with a personal computer.

11. The safety mechanism of claim 10, further comprising a charging regulator circuit in electrical communication with said communications port and said power supply.

12. The safety mechanism of claim 11, wherein said communications port is weather resistant.

* * * * *